United States Patent [19]

Akutsu et al.

[11] Patent Number: 4,765,117

[45] Date of Patent: Aug. 23, 1988

[54] APPARATUS FOR WELDING A STRIP OF TAPE TO FILM

[75] Inventors: Masami Akutsu, Kasukabe; Koh Myowa, Takaoka; Noboru Hirasawa, Tokyo, all of Japan

[73] Assignees: Kureha Chemical Industry Company Limited, Tokyo; Toyama Sanki Company Limited, Toyama, both of Japan

[21] Appl. No.: 75,620

[22] Filed: Jul. 20, 1987

[30] Foreign Application Priority Data

Aug. 7, 1986 [JP] Japan .......................... 61-121839[U]

[51] Int. Cl.[4] ................................................ B65B 61/18

[52] U.S. Cl. ...................................... 53/133; 226/119; 156/519; 493/212; 493/377; 493/380; 53/389; 53/551

[58] Field of Search ......................... 53/133, 551, 389; 156/519; 493/212, 224, 377, 380, 393; 226/119; 83/235

[56] References Cited

U.S. PATENT DOCUMENTS

| | | | |
|---|---|---|---|
| 1,978,715 | 10/1934 | Meisel | 226/119 |
| 2,667,924 | 2/1954 | Dutro | 83/235 |
| 2,958,365 | 11/1960 | Molins | 156/519 |
| 3,287,878 | 11/1966 | Mobley | 53/133 |
| 3,322,604 | 5/1967 | Schott, Jr. | 83/235 X |
| 3,743,567 | 7/1973 | Abler | 226/113 X |
| 3,933,564 | 1/1976 | Jensen | 226/114 X |
| 4,071,178 | 1/1978 | Copp | 226/119 X |
| 4,358,336 | 11/1982 | Focke | 156/519 |

*Primary Examiner*—John Sipos
*Attorney, Agent, or Firm*—Koda and Androlia

[57] ABSTRACT

A film continuously fed passes through first rollers and second rollers disposed at wider spaces than that of the first rollers. The first and second rollers are relatively moved and the speed of part of the film continuously fed is reduced to zero temporarily. The tape cut into a strip is juxtaposed in contact with the part of the film of which the speed is reduced to zero and is welded to the film by means such as the high-frequency welding means in spaced manner.

8 Claims, 9 Drawing Sheets

APPARATUS FOR WELDING A STRIP OF TAPE TO FILM

BACKGROUND OF THE INVENTION AND RELATED ART STATEMENT

The present invention relates to an apparatus for welding a strip of tape to film, and more particularly to an apparatus for cutting the tape into a strip to weld it to a casing film for packing processed foodstuffs such as sausage into a sticklike shape and tear off the film by the strip of tape.

The processed foodstuffs such as sausage and sticklike cheese are packed by a casing film formed of vinylidene chloride into a cylindrical shape and both ends of cylindrical casing film are clamped with aluminum wires. In such film packed sticklike processed foodstuffs, a knife is required to open or cut the casing film packing the processed foodstuffs and accordingly it is inconvenient to a consumer. There are film packed sticklike processed foodstuffs having a cut tape welded to the casing film to facilitate opening or cutting of the film, while the cut tape has been provided over the whole length in the longitudinal direction of the sticklike package heretofore. Accordingly, the long cut tape is required and is expensive.

Heretofore, the cut tape is welded to the casing film of the sticklike package over the whole length thereof along the junction of opposed ends of the casing film formed into a cylinder.

However, the cut tape welded to the casing film over the whole length thereof is hardly picked up by fingers to remove the casing film from the sticklike processed foodstuffs. Further, even if the cut tape is pulled by fingers, the casing film can not be torn and removed easily, but the sticklike processed foodstuffs is bent.

It is an object of the present invention to provide an apparatus for welding a cut tape to a casing film packing sausage and the like so as to facilitate removal of the film.

It is another object of the present invention to provide an apparatus for welding a cut tape to a casing film in which the cut tape for removing the casing film can be used inexpensively and effectively.

It is still another object of the present invention to provide an apparatus for welding a cut tape to a casing film in place without positional deviation.

SUMMARY OF THE INVENTION

In the apparatus according to the present invention, the film for packing sausage and the like is continuously fed by film feeding means.

There are provided, in the course of carrying the film, first rollers disposed in space relationship with each other and through which the film fed from the film feeding means passes and second rollers disposed at narrower spaces than the space between the first rollers and through which the film which is to pass through the first rollers and the film which has passed through the first rollers pass.

The first and second rollers are relatively moved by a roller differential mechanism, and the speed of part of the continuously fed film is reduced zero temporarily by the relative movement of the rollers.

A tape approaches the part of the film of which the speed is reduced zero temporarily by the roller differential mechanism and the tape is cut into a strip by cutting means. The tape cut into a strip is welded to the film in spaced relationship with each other.

DETAILED DESCRIPTION OF PREFERRED EMBODIMENT

Figure 1:
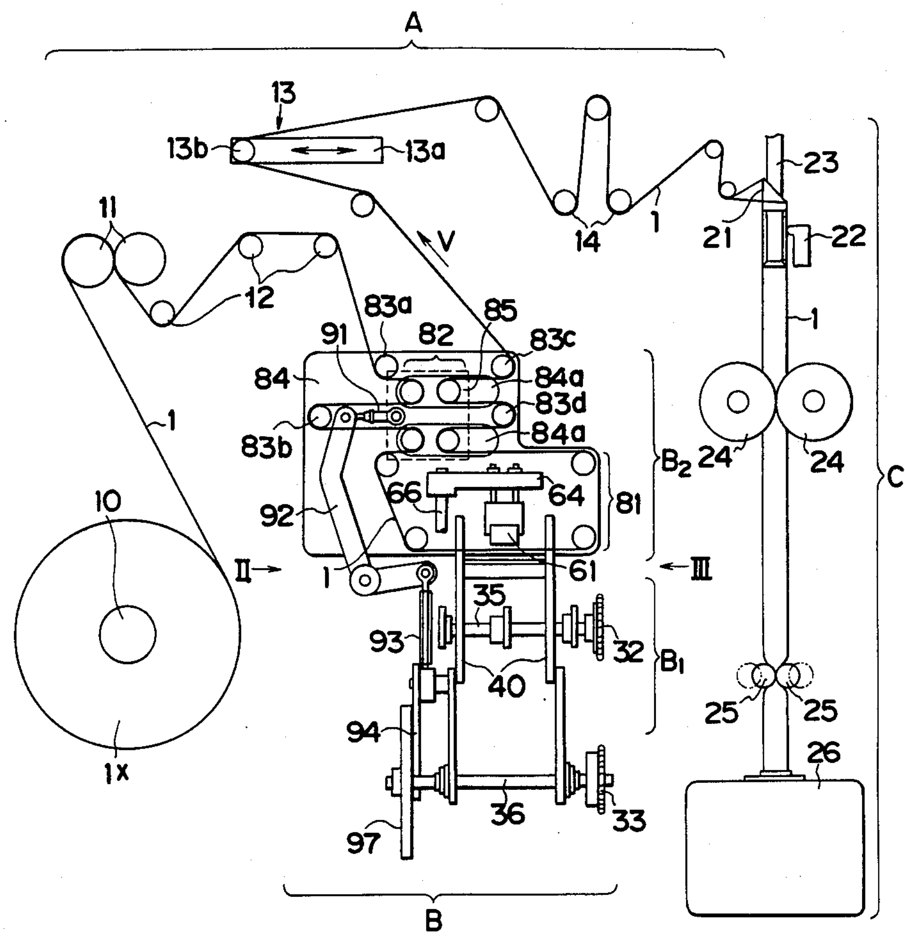
FIG. 1 schematically illustrates a combined processing apparatus of a welding device for welding a strip of tape to film and a filling and packing device for sticklike package such as sausage.

FIG. 1 illustrates a whole configuration of a processing apparatus for processed foodstuffs including a device for welding a strip of tape to film according to the present invention.

The apparatus comprises a film feeding device A which continuously feeds the film 1, a welding device B which cut the tape 2 into a strip to weld it to the film 1, and a filling and packing device C which forms the film 1 to which the tape 2*a* has been welded into a cylinder to sealingly join opposed ends of the film formed into the cylinder to each other and fills processed meat into the joined cylindrical film to manufacture sticklike sausage. All of the devices A to C are disposed on a common base and configure one system as a whole.

The welding device B comprises a tape welding mechanism B, which cuts the tape 2 into a strip and welds the strip of tape 2*a* to the film 1, and a roller differential mechanism $B_2$ which stops the movement of the continuously carrying film 1 with respect to the tape welding mechanism $B_1$ relatively. A motor is employed in common as a power source of the tape welding device B and a power source of the filling and packing device C.

The film feeding device A comprises a supporting roller 10 which supports a film roll 1*x* for the film 1. The film 1 is pulled out from the film roll 1*x* by a pair of feeding rollers 11 at a constant speed. The film 1 is then guided by guide rollers 12 to be fed to the welding device B continuously. The film 1 to which the strip of tape 2*a* has been welded by the welding device B is fed to the filling and packing device C through a phase adjustment mechanism 13 and the guide roller 14.

The phase adjustment device 13 comprises a moving lever 13*a* supported to a chassis and including a length adjustable in right and left direction in the figure and a roller 13*b* supported by the moving lever 13*a*. The phase adjustment mechanism 13 can adjust the film length between the welding device B and the filling and packing device C.

The filling and packing device C comprises a forming device 21 which forms the film to which the strip of tape 2*a* has been welded by the welding device B into a cylinder, a high-frequency electrode 22 which sealingly joins opposed ends of the film formed into the cylinder, and a stuffer 23 which fills processed foodstuffs into the cylindrical film 1. In the filling and packing device C, the film 1 is carried continuously at a constant speed by a pair of feeding rollers 24 and is squeezed at regular intervals by a pair of squeezing rollers 25. The squeezed cylindrical film filled with processed foodstuffs is fastened at the squeezed portion thereof with a clip 4 by a clipping mechanism 26 and is cut at the clipped portion thereof to manufacture sticklike processed foodstuffs such as sausage.

The structure of the welding device B for welding the strip of tape to the film is now described.

Figure 2:
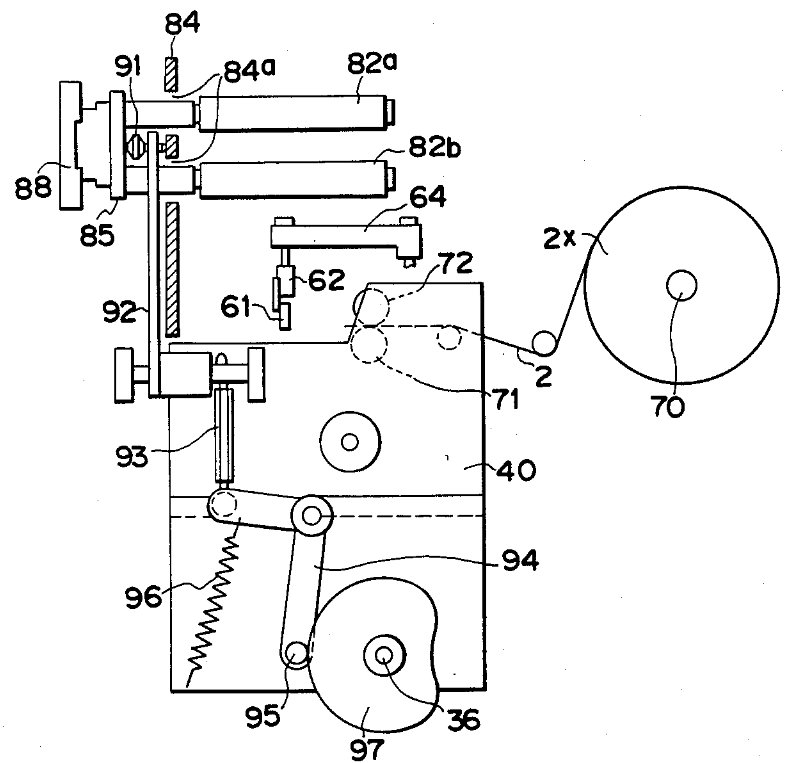
FIG. 2 illustrates a portion of the apparatus of FIG. 1 as viewed from arrow II of FIG. 1.
Figure 3:
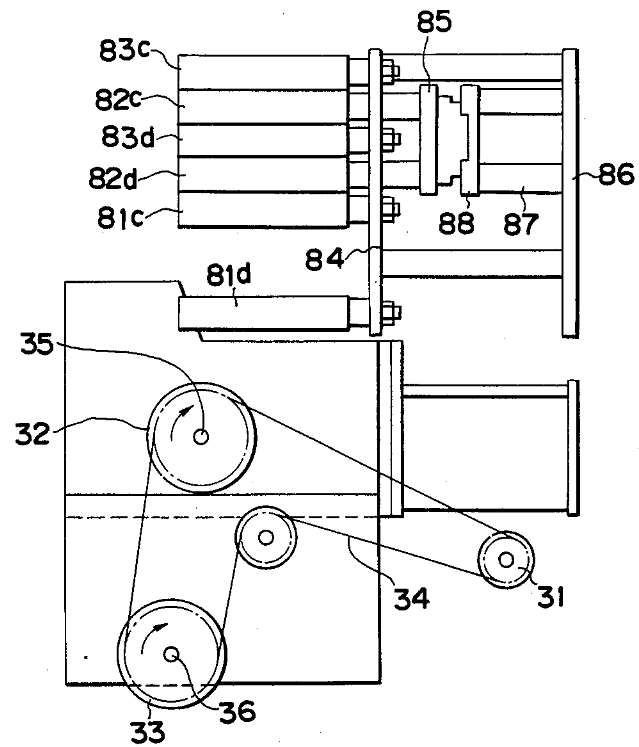
FIG. 3 is a perspective view as viewed from arrow III of FIG. 1.
Figure 4:
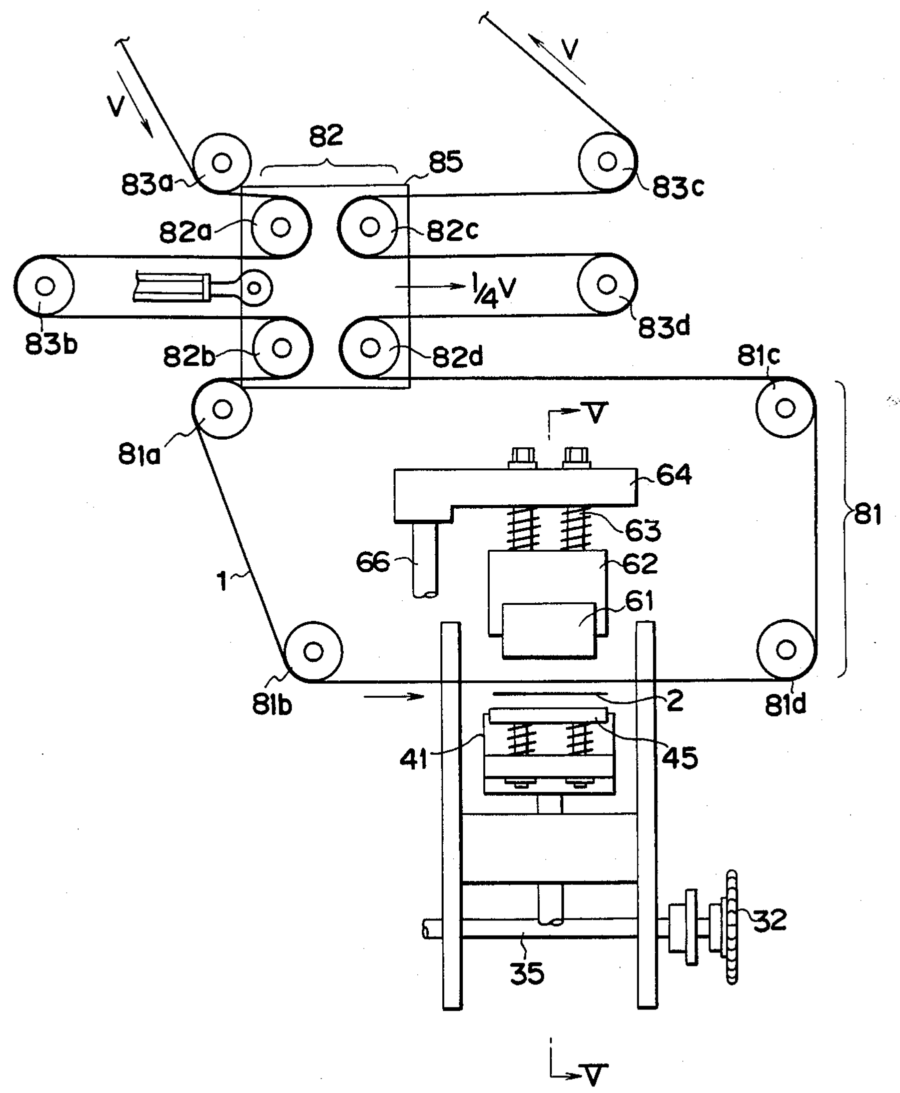
FIG. 4 is an enlarged front view of a roller differential mechanism and a tape welding mechanism in the apparatus of FIG. 1.
Figure 5:
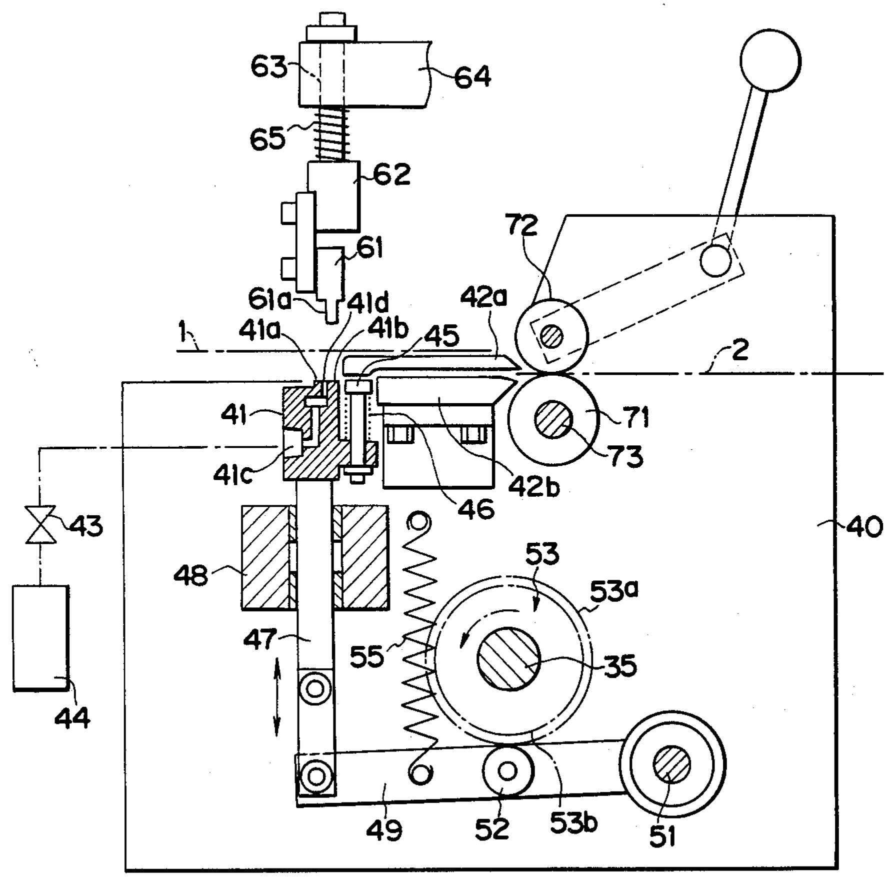
FIG. 5 is a sectional view taken along line V—V of FIG. 4.
Figure 6:
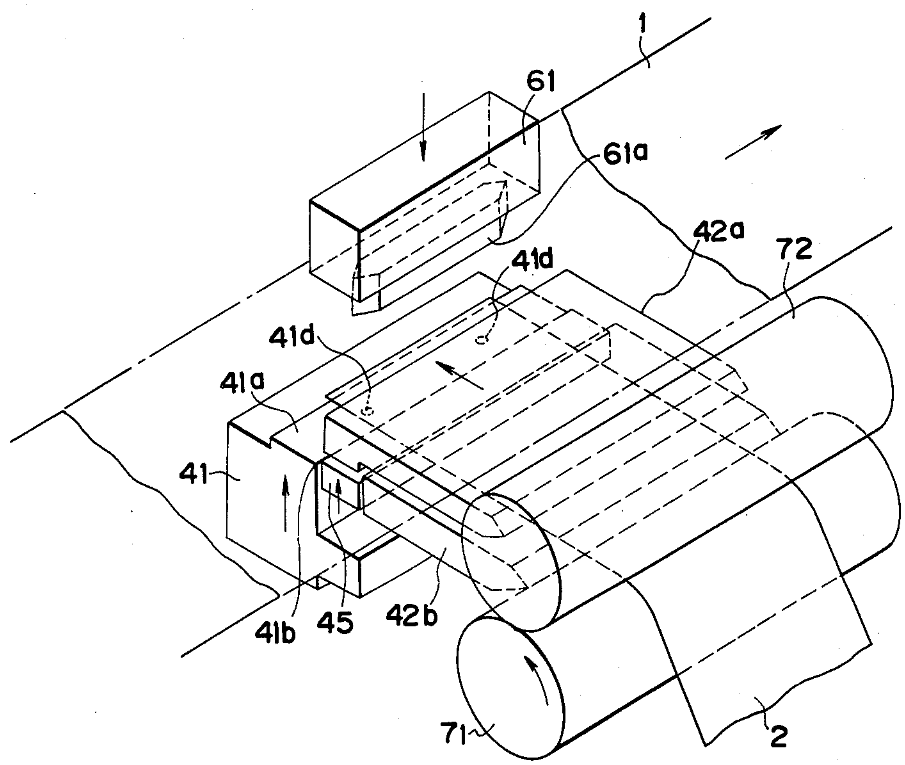
FIG. 6 is a perspective view showing a welded portion of a strip of tape to the film.

FIG. 2 is a left-hand side view showing only the welding device B as viewed from arrow II of FIG. 1. FIG. 3 is a right-hand side view as viewed from arrow III of FIG. 1. FIG. 4 is an enlarged front view of the welding device B. FIG. 5 is a sectional view taken along line V—V of FIG. 4. FIG. 6 is a perspective view showing the welding operation of the tape.

As shown in FIG. 1, the film 1 fed continuously from the film feeding device A passes through the roller differential mechanism $B_2$ and is fed toward the filling and packing device C. The strip of tape is welded to the film 1 passing through the roller differential mechanism $B_2$ by the tape welding mechanism $B_1$.

As shown in FIG. 3, the power of a motor of the apparatus (which is common to the power of the filling and packing device C) is transmitted from a drive sprocket 31 through a chain 34 to follower sprockets 32 and 33. The follower sprocket 32 is fixedly mounted to a drive shaft 35 which drives the roller differential mechanism $B_2$.

The structure of the tape welding mechanism $B_1$ is now described.

As shown in FIG. 5, a lower electrode 41 which is moved up and down is disposed within a pair of right and left side plate 40. The lower electrode 41 forms a negative electrode for high-frequency welding the strip of tape 2*a* to the film 1. A tape pressing surface 41*a* is formed on an upper surface of the lower electrode 41 stepwise with one step higher than the upper surface and an edge 41*b* of a cutter is integrally formed at the right-hand edge thereof. When the lower electrode 41 is moved up, the tape 2 is cut into a strip by an edge of an upper guide member 42*a* of a pair of guide members 42*a* and 42*b* which guide the tape 2 and the edge 41*b* of the cutter. The lower electrode 41 is provided with an air guide hole 41*c* which is coupled with an air suction device 44 through an automatic valve 43. As shown in FIG. 6, tape suction holes 41*d* are formed in the tape pressing surface 41*a*. When the valve 43 is opened, the tape suction holes 41*d* function to suck the tape 2.

A clamp member 45 is supported to the lower electrode 41 slidably in the vertical direction and is urged to move upward with respect to the lower electrode 41 by a spring 46. When the lower electrode 41 is moved up, the clamp member 45 first abuts against the upper guide member 42*a* with pressure and the tape is thus clamped.

A lower end of the lower electrode 41 is coupled with a vertically movable shaft 47 which is supported slidably by a bearing 48 disposed between both side plates 40. A lower end of the vertically movable shaft 47 is coupled with a drive link 49 which is rotatably supported to an axis 51 disposed between the side plates 40. A follower roller 52 is supported to the drive link 49 and the drive link 49 is urged to be rotated by a spring 55 clockwise in FIG. 5. The follower roller 52 abuts against a cam 53 by the rotation of the link 49. The cam 53 is fixedly mounted to the drive shaft 35.

When the drive shaft 35 is driven by the follower sprocket 32 counterclockwise in FIG. 5, the follower roller 52 is moved up and down within a dimensional difference between a locus 53*a* of a maximum diameter and a locus 53*b* of a minimum diameter. The drive shaft 49 is swung in response to the movement of the follower roller 52 so that the lower electrode 41 is moved up and down.

An upper electrode 61 is disposed above the lower electrode 41 in opposed relationship with the lower electrode 41. The upper electrode 61 forms a positive electrode for the high-frequency welding. A lower end of the upper electrode 61 is protruded to form a depressing portion 61*a*. A welded portion 3 (refer to FIG. 9) of the film 1 and the strip of tape 2 is decided by a shape of the depressing portion 61*a*. As shown in FIG. 6, in the embodiment, the depressing portion 61*a* is of a elongated shape having sharp ends formed into an acute angle.

The upper electrode 61 is held by a holding member 62. A shaft 63 is mounted on the holding member 62 and is slidably held to an electrode holder 64. A damper spring 65 is mounted about the shaft 63. As shown in FIG. 4, the electrode holder 64 is fixedly mounted on an upper end of a vertically movable shaft 66. The other cam is fixedly mounted to the drive shaft 35 to which the cam 53 is fixed. The shaft 66 is moved up and down in synchronism with the upward movement of the lower electrode 41.

As shown in FIG. 2, a roller 70 for supporting a tape roll 2*x* of the tape 2 is disposed before the side plate 40. The tape 2 is pulled from the roll 2*x* while being held between a tape feeding roller 71 and a pinch roller 72 which abuts against the roller 71 with pressure. A leading end of the tape 2 passes between upper and lower guide members 42*a* and 42*b* to be guided above the lower electrode 41. As shown in FIG. 5, the tape feeding roller 71 is fixedly mounted to a drive shaft 73. A tape feeding cam not shown is provided to the drive shaft 35 to which the cam 53 is fixed. Movement of the tape feeding cam is transmitted to the drive shaft 73 through one way clutch. The tape feeding roller 71 is rotated counterclockwise in FIG. 5 in synchronism with the timing when the lower electrode 41 is moved down and the upper electrode 61 is moved up, so that the tape 2 is fed slightly.

The structure of the roller differential mechanism $B_2$ is now described.

As shown in FIG. 4, the roller differential mechanism $B_2$ comprises a first roller group 81, a second roller group 82 disposed above the first roller group 81 at shorter intervals, and guide rollers 83*a* to 83*d* disposed at the right and left of the second roller group 82. Rollers 81*a* to 81*d* forming the first roller group 81 and the guide rollers 83*a* to 83*d* are supported by shafts fixedly mounted to the front surface of the front chassis 84 as shown in FIG. 3. Rollers 82*a* to 82*d* forming the second roller group 82 are supported by shafts fixedly mounted to a slide chassis 85 disposed behind the front chassis 84 (refer to FIG. 3). The rollers 82*a* to 82*d* are protruded forward through elongated holes 84*a* formed in the front chassis 84 (refer to FIG. 2). The slide chassis 85 is supported to a guide plate 88 which is fixed to a rear chassis 86 through studs 87. The slide chassis 85 is guided by the guide plate 88 to be slided so that the second roller group 82 is moved relatively to the first roller group 81 in the right and left direction in FIG. 4.

The film 1 which is continuously fed by the film feeding device A passes through the guide roller 83*a*, the roller 82*a*, the guide roller 83*a*, the roller 82*b* and the rollers 81*a* and 81*b* forming the first roller group 81 to be fed between the upper and lower electrodes 61 and 41. The film 1 passed between the electrodes further passes through the rollers 81*d* and 81*c* forming the first roller group 81, the roller 82*d*, the guide roller 83*d*, the roller 82*c* and the guide roller 83*c* to be led to the outside of the welding device B from the guide roller 83*c*.

As shown in FIGS. 1 and 2, the left end of the slide chassis 85 to which the second roller group 82 is fixed is coupled with the drive link through a joint 91. The drive link 92 is coupled with a follower link 94 through a joint 93. A follower roller 95 is supported to the follower link 94 and abuts against the periphery of a cam 97 by resilient force of a spring 96. The cam 97 is supported to the drive shaft to which the follower sprocket 33 is fixed.

As shown in FIG. 3, since the follower sprocket 33 is driven together with the follower sprocket 32 forming a drive source of the tape welding mechanism $B_1$, the slide chassis 85 to which the second roller group 82 is fixed is driven in the right and left direction in synchronism with the movement of the tape welding mechanism $B_1$. The slide chassis 85 and the second roller group 82 are driven in response to the shape of the cam 97. The slide chassis 85 and the second roller group 82 are driven in the right direction in FIG. 4 upon the welding operation by the tape welding mechanism $B_1$. The speed at this time is a quarter of the continuously carrying speed V of the film 1. When the second roller group 82 consisting of the four rollers 82*a* to 82*d* is moved in the right direction at the speed of $(\frac{1}{4}\times v)$, the portion of the film 1 supported through the first roller group 81 is temporarily stopped. After the second roller group 82 has been moved to the rightmost position of FIG. 4, the slide chassis 85 is returned leftward at the maximum speed in accordance with the shape of the cam 97.

Operation is now described.

The film 1 is continuously fed at a constant speed by the feeding rollers 11 of the film feeding device A.

On the other hand, as shown in FIG. 3, the drive force of the drive sprocket 31 rotated by the power source common to the drive source of the filling and packing device C is transmitted to the follower sprockets 32 and 33 through the chain 34 so that the drive shaft 35 for driving the tape welding mechanism $B_1$ and the drive shaft 36 for driving the roller differential mechanism $B_2$ are driven. The tape welding mechanism $B_1$ and the roller differential mechanism $B_2$ are operated by the simultaneously rotating drive shafts 35 and 36 in interlocked relationship with each other.

The cam 97 is driven in response to the rotation of the drive shaft 36. The follower link 94 is then driven in response to the shape of the cam 97. Further, the drive link 92 coupled with the link 97 is also driven and the slide chassis 85 is thus driven in the right and left direction in FIGS. 1 and 4. When the slide chassis 85 is driven at the speed of $(\frac{1}{4}\times v)$ (where v represents the continuously carrying speed of the film 1) in the right direction in the figure in response with the shape of the cam 97, the second roller group 82 is moved relatively to the first roller group 81 and the film 1 passing through the first roller group 81 at this time is stopped temporarily. After the slide chassis 85 has been moved rightward, the slide chassis 85 is returned leftward in the figure at a high speed in response to the shape of the cam 97. The film 1 passing through the first roller group 81 at this time is carried at a higher speed than the speed v in the constant speed movement to recover the delay of the tape feeding operation due to the stop of the film 1.

On the other hand, in the tape welding mechanism $B_1$, the drive shaft 35 rotating together with the follower sprocket 32 drives the cam 53 shown in FIG. 5 and other cams so that the lower and upper electrodes 41 and 61 and the tape feeding roller 71 are driven by operation of the cams. In the operation timing of the members, when the slide chassis 85 of the roller differential mechanism $B_2$ is moved leftward in FIG. 4, the tape feeding roller 71 is rotated by a predetermined angle so that the leading end of the tape 2 is fed on the lower electrode 41 by a distance corresponding to a width of the film 2*a*. When the slide chassis 85 of the roller differential mechanism $B_2$ is moved at the speed of $(\frac{1}{4}\times v)$ rightward in the figure, that is, when the film 1 passing through the first roller group 81 is stopped, the lower electrode 41 is moved up by the cam 53 and the upper electrode 61 is moved down at the same time.

As shown in FIG. 6, when the lower electrode 41 is moved up, the leading end of the tape 2 is pressed to the lower surface of the end of the upper guide member 42*a* by the clamp member 45. The lower electrode 41 is moved up behind the clamp member 45 and when the electrode 41 is moved up, the cutter edge 41*b* provided at the edge of the upper surface of the lower electrode 41 is brought into contact with the leading edge of the upper guide member 42*a* to cut the tape 2 into a strip. The automatic valve 43 (FIG. 5) is opened for a predetermined time before and after the initiation of upward movement of the lower electrode 41 so that air is sucked from the tape suction holes 41*d* formed in the upper surface of the lower electrode 41 by the air suction device 44. The leading end of the tape 2 is held to the lower electrode 41 by the suction force before it is cut by the cutter edge 41*b*. Thus, the cut tape 2*a* is moved up while being held to the lower electrode 41 by the air suction and is juxtaposed in contact with the welded position of the lower surface of the film 1. On the other hand, when the upper electrode holder 64 is lowered, the film 1 and the strip of tape 2*a* are pressed on the pressing portion 41*a* of the lower electrode 41 by the pressing portion 61*a* of the upper electrode 61 held by the electrode holder 64. Then, when both the electrodes 41 and 61 are applied with the high-frequency signal, the strip of tape 2*a* is welded to the film 1. The automatic valve 43 is closed on the way of the welding operation and the suction by air is stopped.

Thereafter, both the electrodes 41 and 61 are separated. Then, the end of the tape 2 is sent out again until the film 1 is stopped next and the above operation is repeated.

The film 1 to which the strip of tape *2a* is welded by the welding device B is fed to the filling and packing device C through the phase adjustment mechanism 13. In the filling and packing device C, while the film 1 is carried at a predetermined speed by the feeding roller 24, the film 1 is formed into a cylinder and sealingly joined by the sealing electrode 22, and the processed foodstuffs is filled into the cylindrical film by the filling member 23. The cylindrical film filled with the processed foodstuffs is squeezed by the squeezing roller 25 and is clipped at the squeezed portion thereof with the clip 4 in the clipping mechanism 26 in the sealed manner, and thereafter the squeezed portion is cut to manufacture the package filled with the processed foodstuffs.

In the filling and packing device C, when the cylindrical film filled with the processed foodstuffs is clipped with the clip 4 in the clipping mechanism 26 and is cut at the squeezed portion, the strip of tape *2a* must be positioned to the clipped and cut position. Accordingly, as described above, the same motor is employed as the power source for the welding device B and the filling and packing device C and both the device B and C are operated in interlocked relationship with each other. In the phase adjustment mechanism 13 shown in FIG. 13, the position of the roller **13*b* is moved to vary the length of the film 1** extending between the welding device B and the filling and packing device C so that the welded portion of the tape *2a* can be positioned to meet the operation timing of the clipping and cut portion. Thus, the operation of both the devices B and C is attained by the same drive source at the same timing and the length of the film 1 between both the devices B and C can be adjusted so that the middle portion of the tape *2a* is exactly cut in the filling and packing device C.

Figure 9:
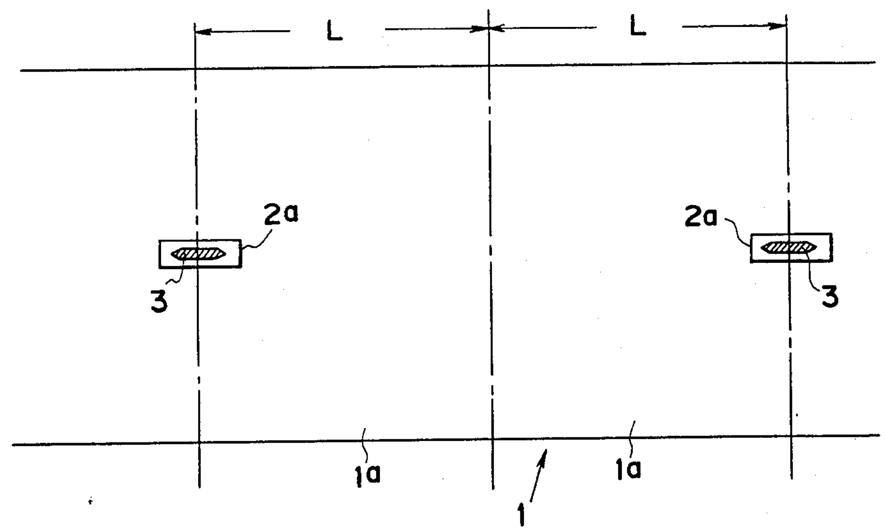
FIG. 9 is a plan view showing the welded strip of tape to the film.
Figure 11:
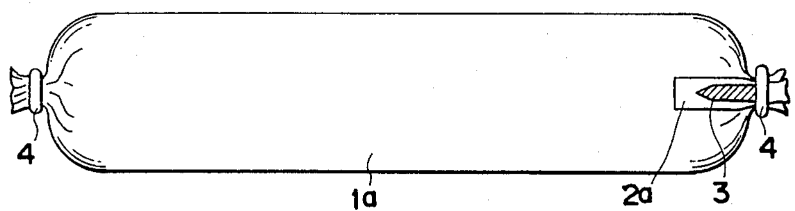
FIG. 11 is a front view showing the complete sticklike package.
Figure 12:
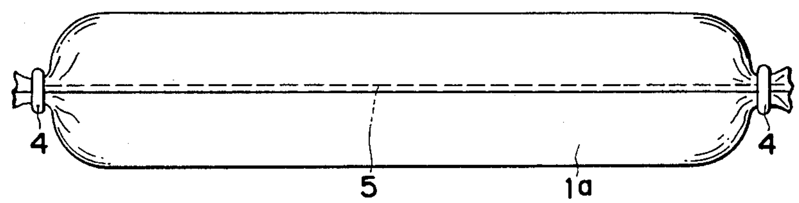
FIG. 12 is a rear view of the sticklike package shown in FIG. 11.

In the illustrated embodiment, as shown in FIG. 9, the strip of tape *2a* is welded to the film 1 at intervals of twice the unit length (L) of the sticklike package. Accordingly, the complete stickline package includes the strip of tape *2a* welded only at one side as shown in FIG. 11. Alternatively, the strip of tape *2a* may be welded to the film 1 at intervals of the length (L) so that the package provided with the strip of tape *2a* at both ends thereof is manufactured.

The apparatus can vary the unit length (L) of the complete sticklike package. The adjustment thereof merely changes the moving speed of the film 1. Since the filling and packing device C and the welding device B are always operated in interlocked relationship with each other in a predetermined cycle, when the moving speed of the film 1 is made slow, the welding pitch of the strip of tape *2a* (for example, $2\times L$) and the clipping and cutting pitch (L) in the filling and packing device C are short, and the unit length of the pacakge is also short. On the contrary, when the moving speed of the film 1 is made fast, the unit length of the package can be long.

Figure 10:
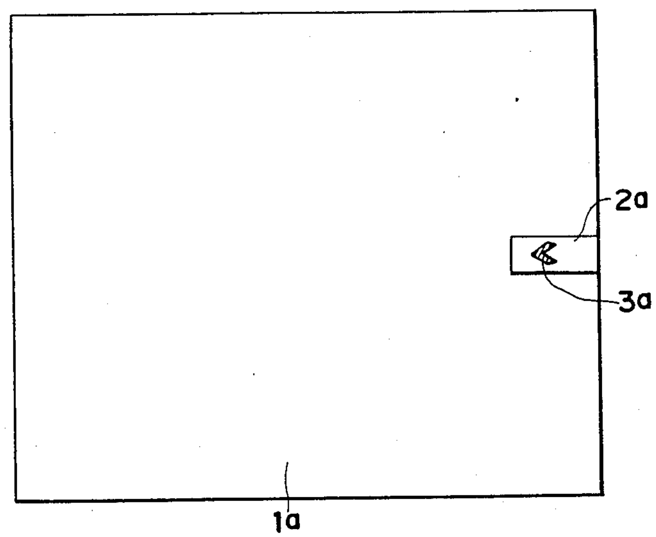
FIG. 10 is a plan view showing a casing film having a welded portion having another shape.

If the shape of the pressing portion **61*a* of the upper electrode 61 in the high-frequency welding is changed, a welded portion 3*a* having a shape as shown in FIG. 10** can be formed.

Figure 7:
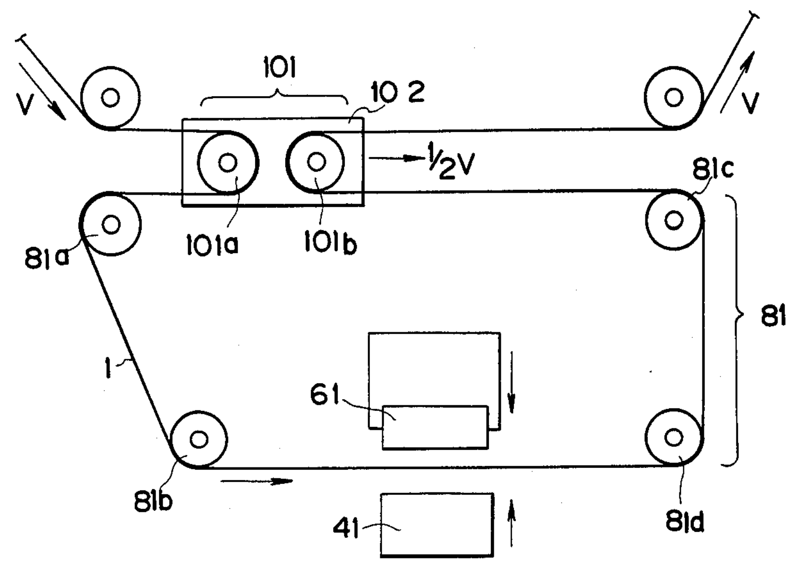
FIGS. 7 and 8 are front views showing a roller differential mechanism according to another embodiment.
Figure 8:
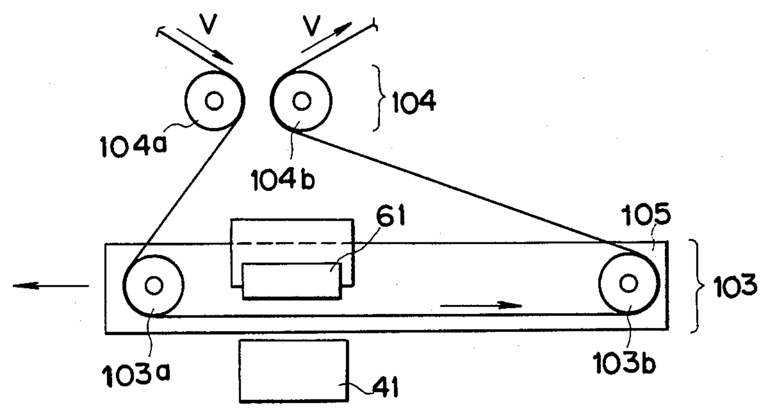

FIGS. 7 and 8 illustrate other embodiments of the roller differential mechanism $B_2$.

In the embodiment of FIG. 7, a second roller group 101 comprises two rollers **101*a* and 101*b*. When a slide chassis 102 supporting the second roller group is moved at the speed of $(\frac{1}{2}\times v)$ rightward in the figure (where v represents the moving speed of the film 1), the speed of the film 1 supported on the first roller group 81** is zero.

In the embodiment of FIG. 9, in contrast with the embodiment of FIG. 7, rollers **104*a* and 104*b* forming a second roller group 104 are fixed while rollers 103*a* and 103*b* forming a first roller group 103 are supported on a slide chassis 105 and are driven leftward in FIG. 8. In this case, by selecting the speed of the slide chassis 105, the film 1 passing through the first roller group 103 can be stopped relatively to the lower electrode 41**.

In the embodiments, while the high-frequency welding is adopted as means for welding the tape *2a* since vinylidene chloride film is used for the film 1, the thermal welding and the ultrasonic welding may be used for the welding means.

The sticklike processed foodstuffs such as sausage manufactured by the above apparatus are formed as shown in FIGS. 11 to 14. This sticklike package is formed into a cylinder and includes opposed ends sealingly joined with each other at a seal line 5. The strip of tape *2a* is fixed by a partially welded portion 3 at a fastened portion by the clip 4.

Figure 13:
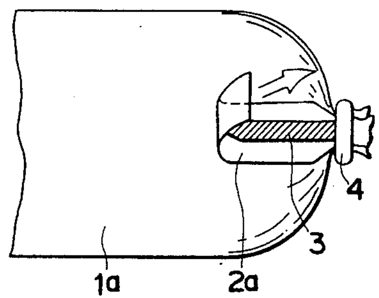
FIG. 13 is a partially enlarged view showing the welded portion of the strip of tape on the sticklike package.
Figure 14:
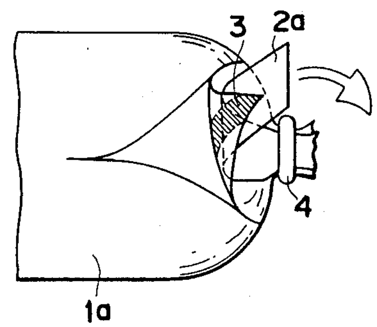
FIG. 14 is a partially enlarged view showing removal of the casing film by the strip of tape.

In order to remove the film 1 from the processed foodstuffs, an end of the cut tape *2a* is held between fingers and is pulled up as shown in FIG. 13. Thus, the film **1*a* is torn from an end of the welded portion 3 as shown in FIG. 14 and the film 1** can be easily removed.

As described above, according to the present invention, the strips of tape can be welded to the film in spaced relationship with each other continuously and automatically, and the sausage packing film with the cut tape can be manufactured continuously. Sausage having the shape shown inFIG. 11 can be manufactured continuously in interlocked relationship with the filling device for the processed foodstuffs such as sausage. Since the film is continuously carried without sudden stop by an electromagnetic clutch and is stopped relatively in the welding mechanism of the tape, when the filling and packing device for sausage is subsequently disposed behind the welding device of the film and the tape, the film can be prevent that unnecessary extra tension is effected to the film. Since the film is always fed stably as described above, the welded position of the tape to the complete package is not deviated. Further, since the film is always fed continuously, the welding operation of the tape and the filling and packing operation of sausage can be made fast and the processing speed can be increased. Since the film is partially stopped seemingly by the relative movement of the two rollers, it is sufficient to merely weld the tape to the film being at a standstill. Accordingly, the design of the structure of the tape welding mechanism is simple.

We claim:

1. An apparatus for welding a strip of tape to film comprising:
   - means for feeding the film at a constant speed;
   - first rollers disposed in spaced relationship and through which the film fed from said film feeding means passes;
   - second rollers disposed above the first rollers at narrower spaces than the space between the first rollers and through which the film which is to pass through said first rollers and the film which has been passed through said first roller pass, said second rollers comprising four equally spaced rollers;

four guide rollers disposed at a right and left of said second rollers;

a roller differential mechanism for moving said second rollers in a first direction relative to said first and guide rollers at one quarter of said constant speed to temporarily reduce a speed of part of the film being fed continuously to zero and for moving said second rollers in a second direction opposite to said first direction relatively to said first and guide rollers at a high speed to temporarily increase a speed of part of the film being fed continuously to a speed higher than said constant speed;

tape feeding means for feeding the tape to the part of the film which the speed is temporarily reduced to zero by said roller differential mechanism;

means for cutting the tape being fed into a strip; and means for welding the tape cut into the strip to the part of the film of which the speed is temporarily reduced to zero.

2. An apparatus according to claim 1, wherein said welding means comprises a pair of high-frequency electrodes opposed to each other while holding the film therebetween and urged to be driven in a direction in which the film and the tape are held between the pair of electrodes.

3. An apparatus according to claim 2, wherein one of said pair of high-frequency electrodes includes a tape suction hole for sucking the tape to hold it to said electrode to weld it to the film.

4. An apparatus according to claim 3, wherein said electrode having said tape suction hole includes a cutting edge and said apparatus further comprises a tape guide disposed at a side of said electrode and including a cutting edge which is mated with the cutting edge of said electrode to cut the tape into a strip when said high-frequency electrode is moved toward the film.

5. An apparatus according to claim 1, wherein said roller differential mechanism comprises a slide chassis for supporting the second rollers, a link mechanism coupled with said slide chassis, and a cam for actuating said link mechanism.

6. An apparatus according to claim 5, wherein said cam for actuating said link mechanism is driven by the same power source as that of said welding mechanism for welding the tape, said tape cutting means and said tape feeding means.

7. An apparatus according to claim 1, wherein said means for welding the tape forms a smaller welded portion than an area of the tape cut into a strip.

8. An apparatus according to claim 1, wherein the film is a casing film formed into a cylinder to pack processed foodstuffs, the strip of tape is welded to an end of the casing film, and both ends of the tape and the casing film are clamped with a clamp member.

* * * * *